(12) United States Patent  
Hsu (10) Patent No.: US 7,793,956 B2  
(45) Date of Patent: Sep. 14, 2010

(54) SCOOTER WITH DRIVING MECHANISM

(75) Inventor: Mei-Yen Hsu, Kaohsiung (TW)

(73) Assignee: Laing Ban International Inc., Taipei County (TW)

( * ) Notice: Subject to any disclaimer, the term of this patent is extended or adjusted under 35 U.S.C. 154(b) by 170 days.

(21) Appl. No.: 12/285,188

(22) Filed: Sep. 30, 2008

(65) Prior Publication Data

US 2010/0078913 A1   Apr. 1, 2010

(51) Int. Cl.
B62M 1/04   (2006.01)

(52) U.S. Cl. ................ 280/221; 280/267; 280/210; 280/220; 280/252; 280/1.175; 280/87.01; 280/87.041

(58) Field of Classification Search ............... 280/210, 280/267, 221, 220, 252, 1.175, 87.01, 87.041
See application file for complete search history.

(56) References Cited

U.S. PATENT DOCUMENTS

| | | | |
|---|---|---|---|
| 1,014,279 A * | 1/1912 | Auger | 280/221 |
| 6,796,570 B1 * | 9/2004 | Chang | 280/255 |
| D579,987 S * | 11/2008 | Hong | D21/423 |
| 7,581,742 B2 * | 9/2009 | Chiu et al. | 280/252 |
| 2004/0036249 A1 * | 2/2004 | McGuire et al. | 280/253 |
| 2008/0054588 A1 * | 3/2008 | Walker | 280/221 |
| 2008/0088109 A1 * | 4/2008 | Chiu et al. | 280/221 |
| 2008/0224439 A1 * | 9/2008 | Prior et al. | 280/221 |
| 2009/0066053 A1 * | 3/2009 | Yan | 280/252 |

* cited by examiner

*Primary Examiner*—Lesley Morris  
*Assistant Examiner*—Marlon A Arce  
(74) *Attorney, Agent, or Firm*—Rosenberg, Klein & Lee (57) ABSTRACT

The present invention provides a scooter with driving mechanism comprising a scooter assembly and at least a driving mechanism, wherein the scooter assembly has a treadle and a rear wheel; the driving mechanism comprises a reset device and a transmission device, which has an irreversible transmission unit and a passively driven gear, wherein the passively driven gear is driven by the driving gear in meshed manner to drive the irreversible transmission unit in relay way, the irreversible transmission unit, which is connected to the rear wheel, is served to drive the rear wheel to rotate in single direction. Thus, by means of the treading and releasing actions with the treadle, the scooter can be driven smoothly with benefits in not only the risk of tumbling down accident being avoided but also the effects in energy-saving and environmental protection being achieved.

4 Claims, 7 Drawing Sheets

SCOOTER WITH DRIVING MECHANISM

FIELD OF THE INVENTION

The present invention provides a scooter with driving mechanism, particularly for one that can produce rotation repeatedly via an irreversible transmission unit to activate the wheel so that the scooter can be driven to run forwardly.

BACKGROUND OF THE INVENTION

Generally, the driving way for the conventional scooter has two ways, namely the foot kicking propulsion and electric driving mechanism, which is developed in recent years. The former way is that one foot of the user stands on the scooter deck while the other foot is served to kick the ground backwardly to push the scooter run forwardly, while the latter one is driven by a motor installed thereon, and the electricity used by the motor is charged by another battery. As for two driving ways described above, for the former, the user must use one foot to frequently kick the ground, which may step in a muddy or wet place or tumble down accidentally that incurs safety risk; For the latter, the battery should be recharged frequently to maintain the enough power supply, which cause too much inconvenient and energy-consuming drawback. Having realized the issues of the two conventional driving ways for the scooter, the inventor of the present invention develops a novel driving way, which is different from the conventional driving ways aforesaid that the user of the scooter neither to kick the ground nor to rely on the motor. By using the driving mechanism, what the user need to do is that standing on the scooter deck by constantly treading and releasing the driving mechanism, then the scooter will be driven to run forwards in smooth manner.

SUMMARY OF THE INVENTION

The primary object of the present invention is to provide a scooter with driving mechanism comprises a scooter assembly with a tread deck, and at least a driving mechanism, wherein the tread deck has a treadle and at least a rear wheel; the treadle includes a jointing lever extensively disposed at the front bottom side thereof such that the one end of the jointing lever is hingedly linked with the extension brackets by a shaft while the other end of the jointing lever is hingedly linked with the tread deck by a linking rod; the rear wheel, which is disposed at the rear end of the extension brackets by a spindle; the driving mechanism comprises a reset device, a transmission device, an irreversible transmission unit and a casing, wherein the reset device includes a stationary shaft, a hollow driving gear, a wire recess drum, a pulling wire and a spring coil, wherein the both ends of the stationary shaft are transversely extended and firmly fixed on the extension brackets to hold the reset device, the driving gear has at least a set of the spring coil disposed therein, the wire recess drum is disposed at the external side of the driving gear for being wound by the pulling wire, the other end of the pulling wire is connected to the linking rod of the jointing lever, the internal end of the spring coil is securely fixed on the stationary shaft while the external end of the spring coil is securely fixed in the inner wall of the driving gear; the transmission device, which is disposed on the spindle of the rear wheel with a bearing set therebetween, has an irreversible transmission unit and a passively driven gear, wherein the passively driven gear is driven by the driving gear in meshed manner to drive the irreversible transmission unit in relay way, the irreversible transmission unit, which is connected to the rear wheel, is served to drive the rear wheel to rotate in single direction; and the casing is composed of two hollow half covers to contain the reset device and transmission device therein.

The scooter with driving mechanism accords with aforesaid one, wherein a pair of extension brackets with the linking rod of the treadle is disposed near the breech end of the tread deck in symmetrical parallel juxtaposition outside of the driving mechanism and the rear wheel such that the driving mechanism and the rear wheel are securely disposed therebetween.

The scooter with driving mechanism accords with aforesaid one, wherein the rear wheel has plural pegging holes created at the inner lateral side facing towards the irreversible transmission unit, while the irreversible transmission unit has plural pegs backwardly protruded at the outer side facing towards the rear wheel to correspond the pegging holes of the rear wheel so that the irreversible transmission unit can actively drive the rear wheel in coupling manner.

The scooter with driving mechanism accords with aforesaid one, wherein the irreversible transmission unit is a ratchet to comprise an inner ring and an outer ring, wherein, the inner ring, which is coupled with the passively driven gear to rotate in synchronous manner, has plural dents created on the outer peripheral thereof such that each dent has a arched catch being pushed against by a elastic reed; and the outer ring, whose inner wall has plural gear notches for being caught by the arched catch of the inner ring to be driven by the inner ring in single direction of rotation transmission, has plural pegs backwardly protruded at the outer side facing towards the rear wheel to correspond the pegging holes of the rear wheel.

DETAILED DESCRIPTION OF THE PREFERRED EMBODIMENT

Figure 1:
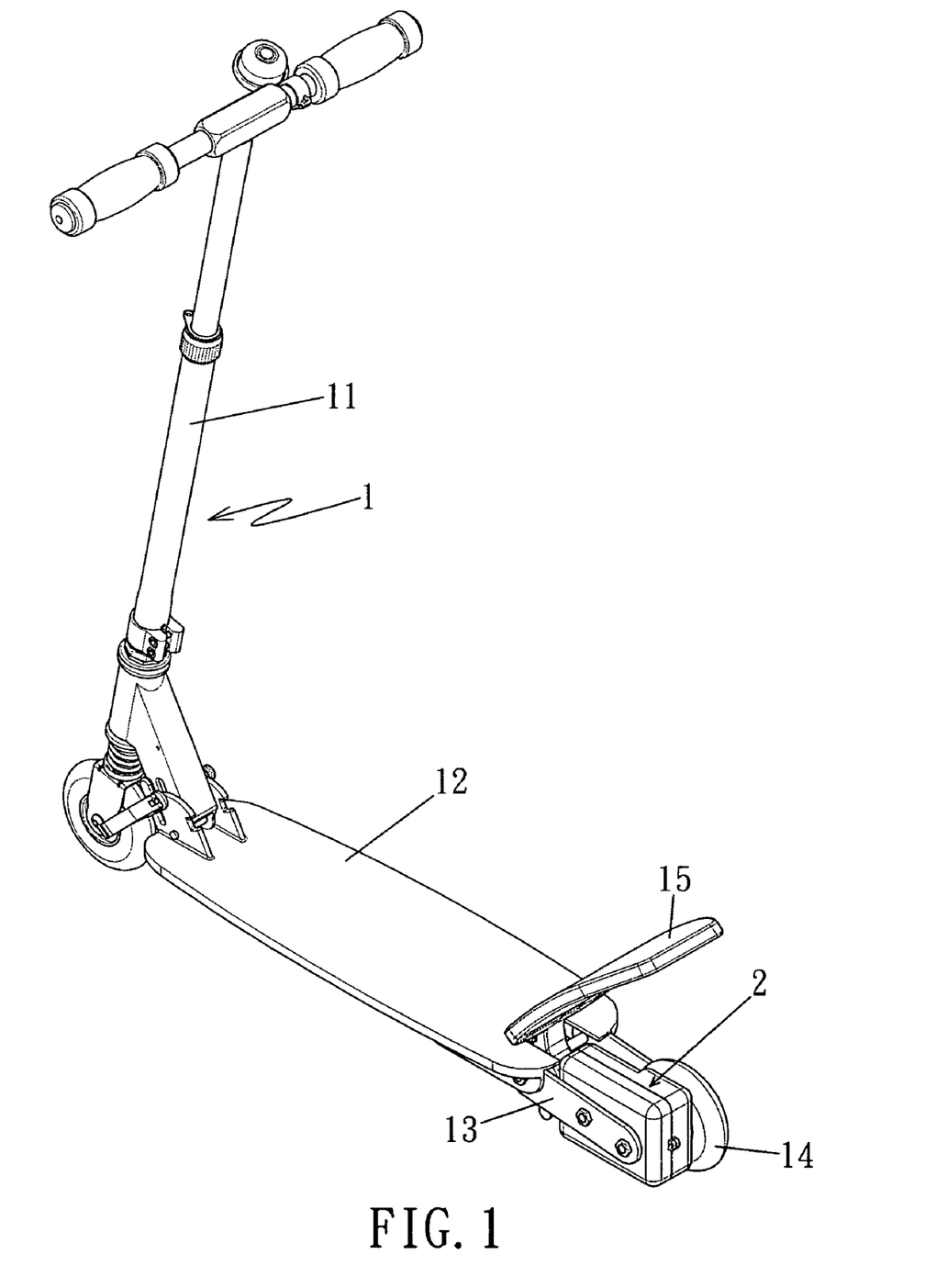
FIG. 1 is the perspective schematic view showing the appearance of the scooter for the present invention.
Figure 2:
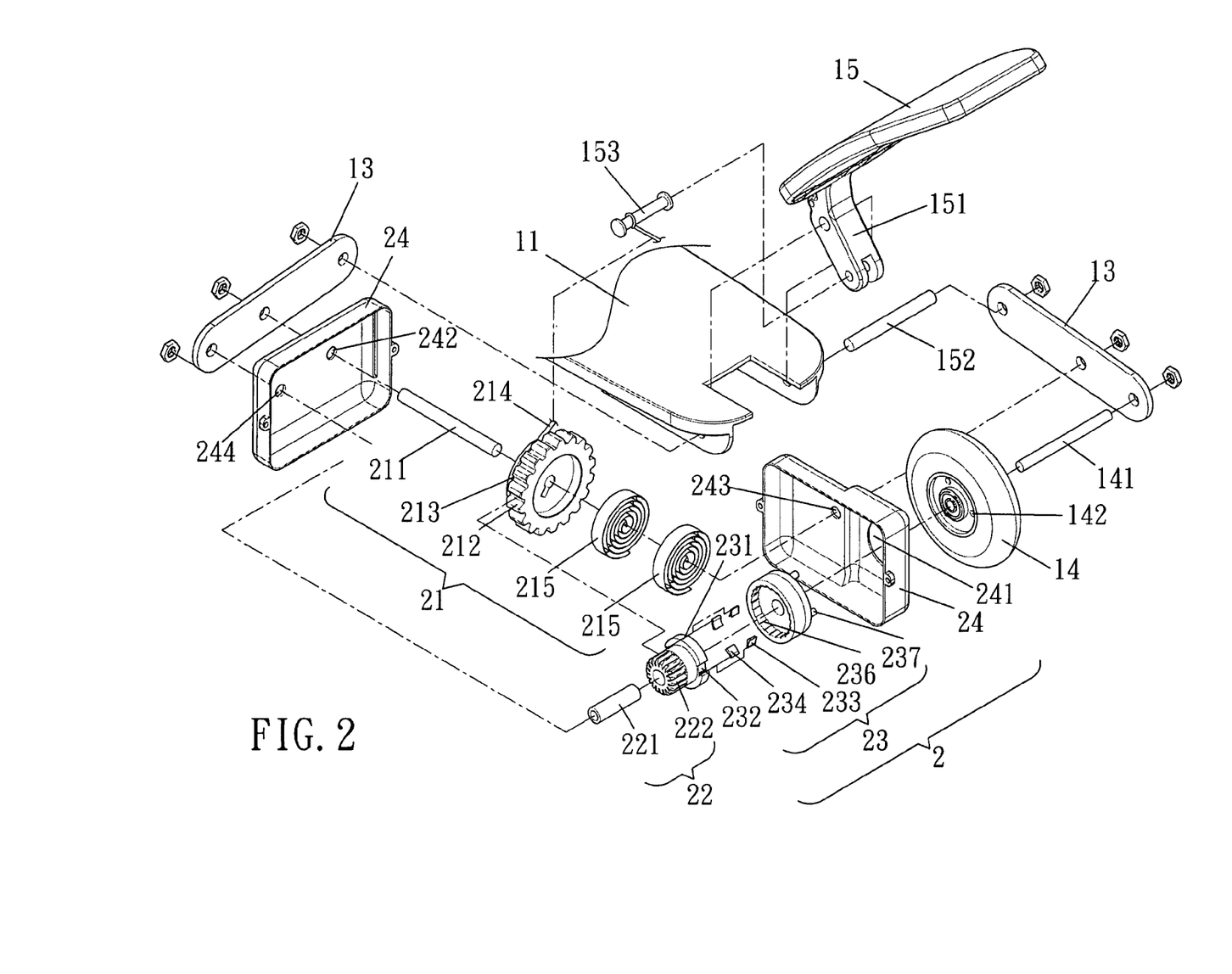
FIG. 2 is the partial exploded schematic view for the scooter of the present invention.

Regarding the technical means of the inventor, we here present a preferred exemplary embodiment with associated drawings to describe in detail manner for your better perusal, understanding and recognizing the present invention. Firstly, please refer to FIGS. 1 and 2. FIG. 1 is the perspective schematic view showing the appearance of the scooter for the present invention while FIG. 2 is the partial exploded schematic view for the scooter of the present invention. The scooter, which is served as transportation vehicle, is presented by the present invention as a preferred exemplary embodiment. The scooter with driving mechanism of the present invention comprises a scooter assembly 1 and a driving mechanism 2, wherein:

As shown in the FIGS. 1 and 2, the scooter assembly 1 comprises a handle post 11, an elongated tread deck 12, a pair of extension brackets 13, a rear wheel 14 and a treadle 15, wherein the handle post 11 includes a foldable steering handle on the top end thereof, the elongated tread deck 12 is mainly served to support the exerciser or rider thereon, the extension brackets 13 is disposed at the suitable position near the breech end of the tread deck 12, the rear wheel 14, which is disposed at the rear end of the extension brackets 13 by a spindle 141, has plural pegging holes 142 created at the inner lateral side thereof, and the treadle 15, which is disposed at the rear end of the tread deck 12 in backwardly up manner, includes a jointing lever 151 extensively disposed at the front bottom side thereof such that the one end of the jointing lever 151 is hingedly linked with the extension brackets 13 by a shaft 152 while the other end of the jointing lever 151 is hingedly linked with the tread deck 12 by a linking rod 153; and The driving mechanism 2, which is disposed between the pair of extension brackets 13 at the middle section as shown in the FIG. 2, comprises a reset device 21, a transmission device 22, an irreversible transmission unit 23 and a casing 24, wherein:

The reset device 21 includes a stationary shaft 211, a hollow driving gear 212, a wire recess drum 213, a pulling wire 214 and a spring coil 215, wherein the both ends of the stationary shaft 211 are transversely extended and firmly fixed on the extension brackets 13 to hold the reset device 21, the driving gear 212 has at least a set of the spring coil 215 disposed therein, the wire recess drum 213 is disposed at the external side of the driving gear 212 for being wound by the pulling wire 214, the other end of the pulling wire 214 is connected to the linking rod 153 of the jointing lever 151, the internal end of the spring coil 215 is securely fixed on the stationary shaft 211 while the external end of the spring coil 215 is securely fixed in the inner wall of the driving gear 212;

The transmission device 22, which is disposed on the spindle 141 of the rear wheel 14 with a bearing 221 set therebetween, has an irreversible transmission unit 23 and a passively driven gear 222, wherein the passively driven gear 222 is driven by the driving gear 212 in meshed manner to drive the irreversible transmission unit 23 in relay way, and The irreversible transmission unit 23, which is a ratchet, comprises an inner ring 231 and an outer ring 235, wherein, the inner ring 231, which is coupled with the passively driven gear 222 to rotate in synchronous manner, has plural dents 232 created on the outer peripheral thereof such that each dent 232 has a arched catch 234 being pushed against by a elastic reed 233; and the outer ring 235, whose inner wall has plural gear notches 236 for being caught by the arched catch 234 of the inner ring 231 to be driven by the inner ring 231 in single direction of rotation transmission, has plural pegs 237 backwardly protruded at the outer side facing towards the rear wheel 14 to correspond the pegging holes 142 of the rear wheel 14; and The casing 24, which is composed of two hollow half covers to contain the reset device 21 and transmission device 22 therein, has a round hole 241 and plural pinholes 242, 243, 244 formed to be run through by the stationary shaft 211, the spindle 141 and the pegs 237 respectively.

Figure 3:
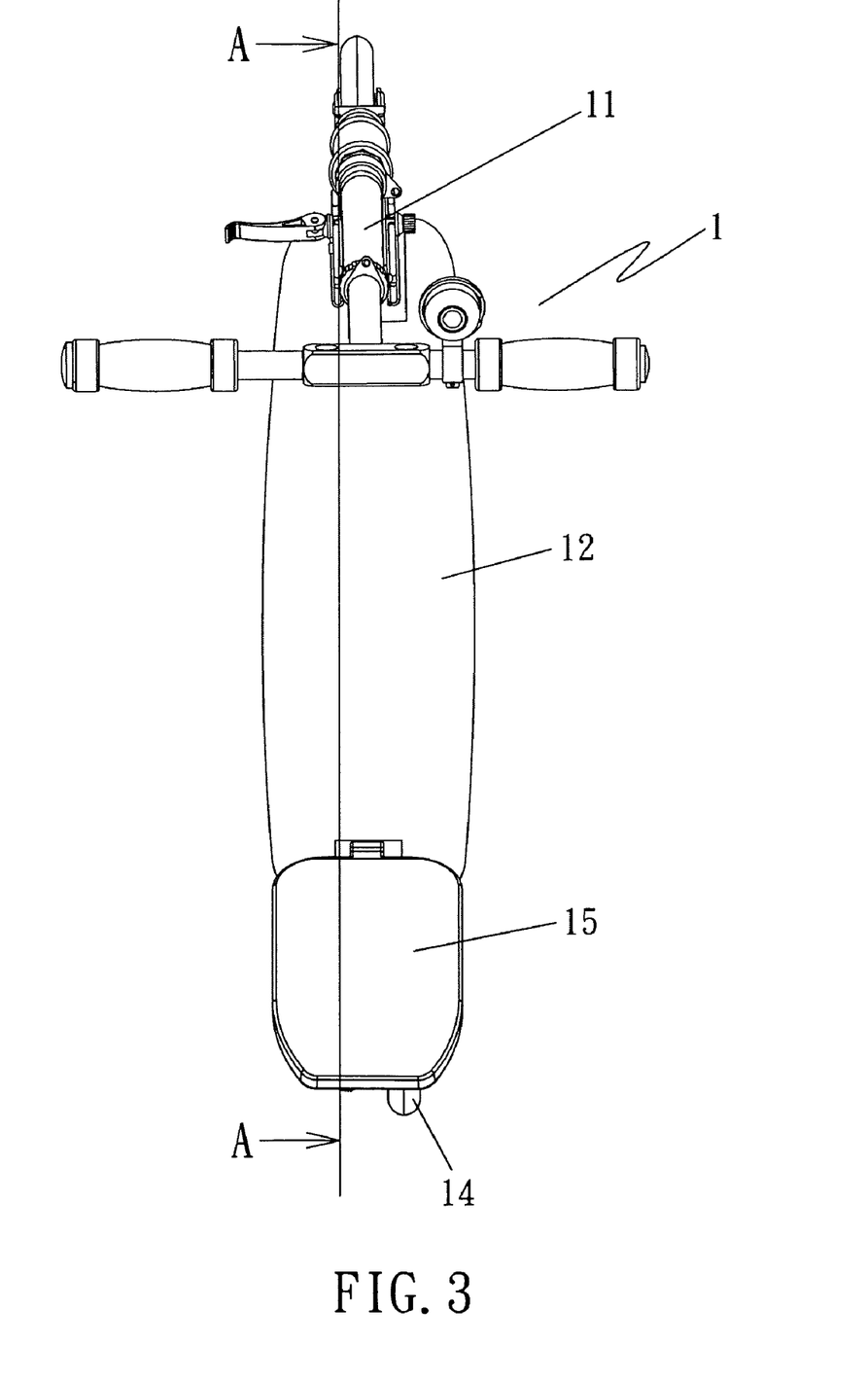
FIG. 3 is the top schematic view for the scooter of the present invention.
Figure 4:
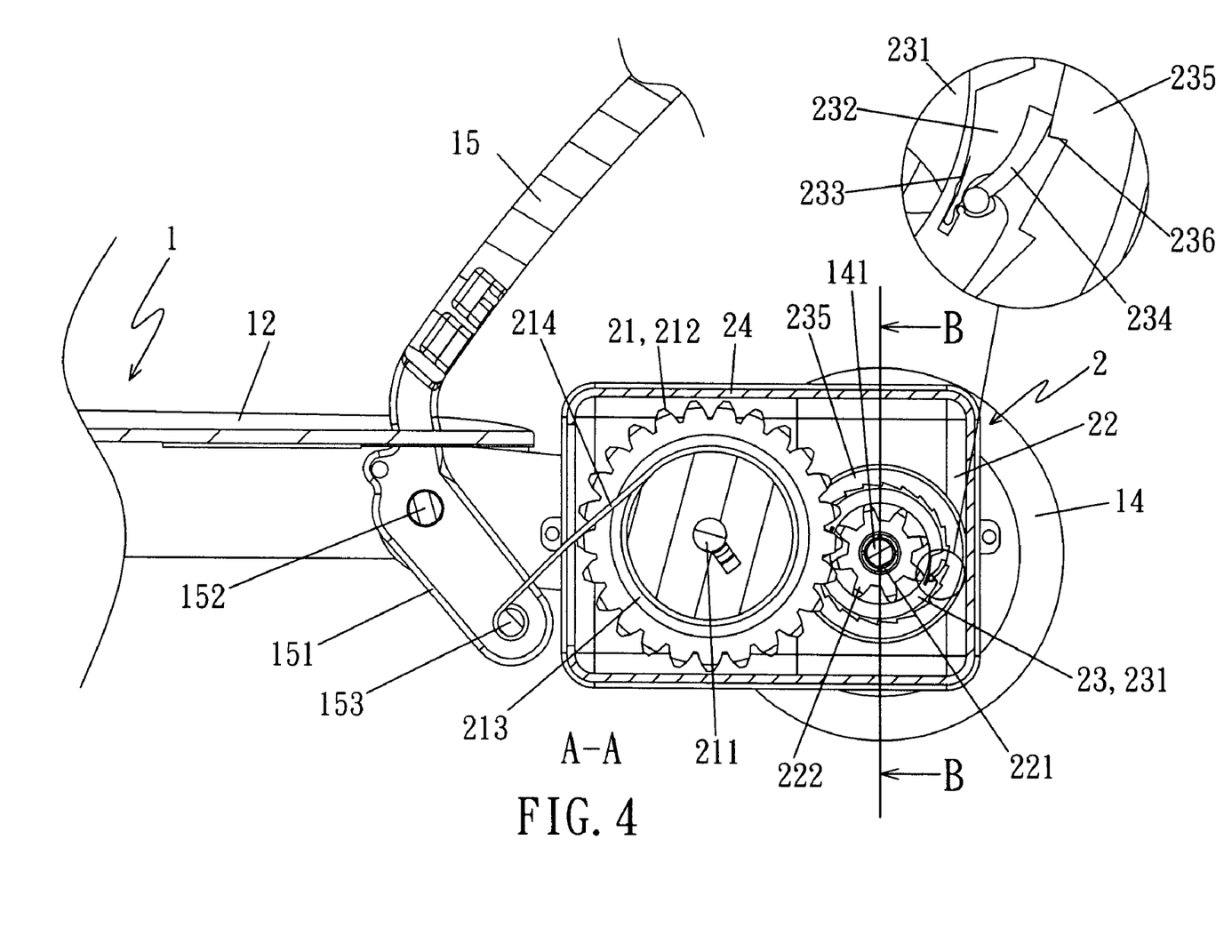
FIG. 4 is the cross section view taken along the line A-A from the previous FIG. 3.
Figure 5:
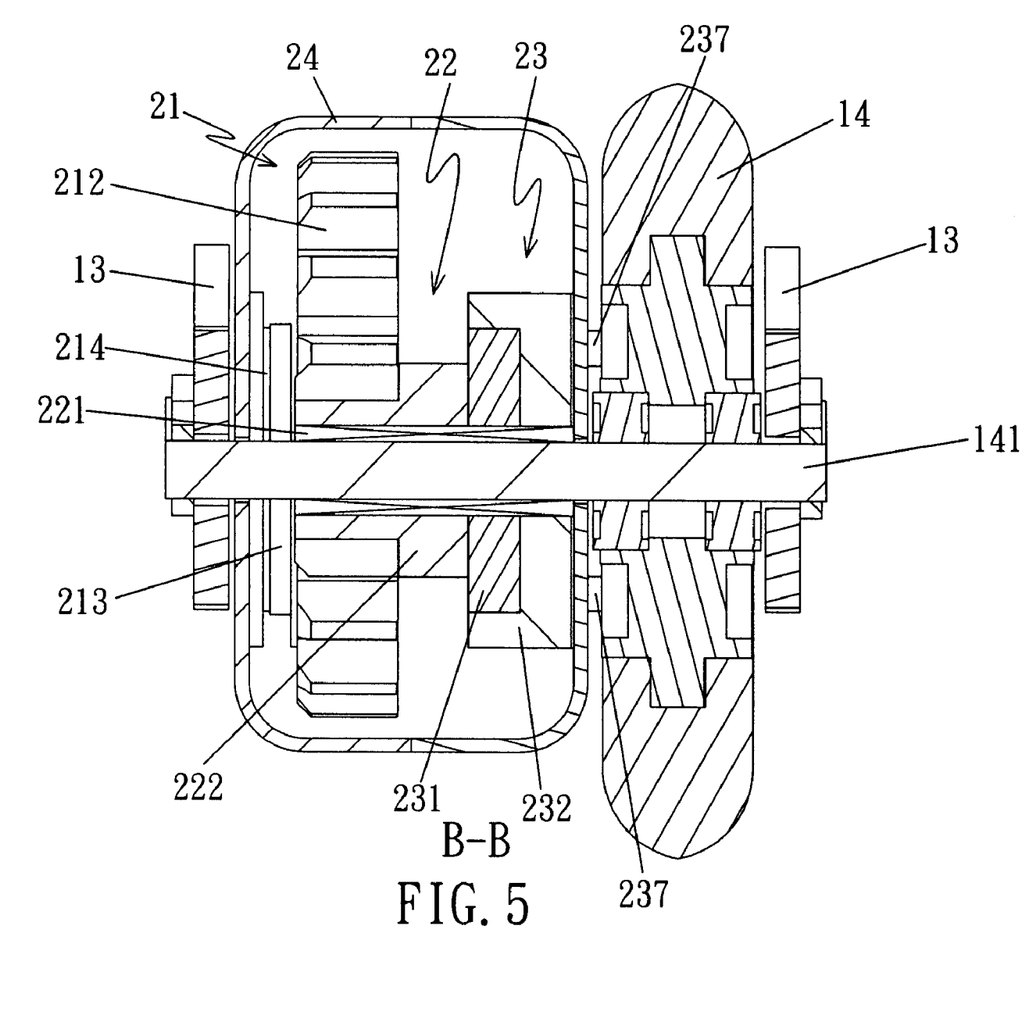
FIG. 5 is the cross section view taken along the line B-B from the previous FIG. 3.

Regarding the assembly for the scooter of the present invention, please refer to FIGS. 3, 4 and 5, which are the top view and cross section view respectively in schematic illustration. The extension bracket 13 and treadle 15 are assembled and securely fixed at the breech end of the tread deck 12 for the scooter assembly 1 mainly by the shaft 152 of the jointing lever 151, which is at the front bottom side. The driving mechanism 2 is mounted at the middle section of the extension brackets 13 by the stationary shaft 211 running through the pinholes 242, 243 on the casing 24 in extending manner towards the treadle 15 to link the linking rod 153 of the treadle 15. The rear wheel 14 is mounted on the extension brackets 13 by the both ends of the spindle 141 respectively protruding the round hole 241 and pinhole 244 such that the rear wheel 14 is located between the casing 24 of the driving mechanism 2 and the extension bracket 13. The driving mechanism 2 is coupled to the rear wheel 14 by running the pegs 237 through the round hole 241 of the casing 24 and inserting the pegs 237 into the pegging holes 142 of the rear wheel 14. Thereby, a finished scooter of the present invention is completely assembled as shown in the figures related.

Figure 6:
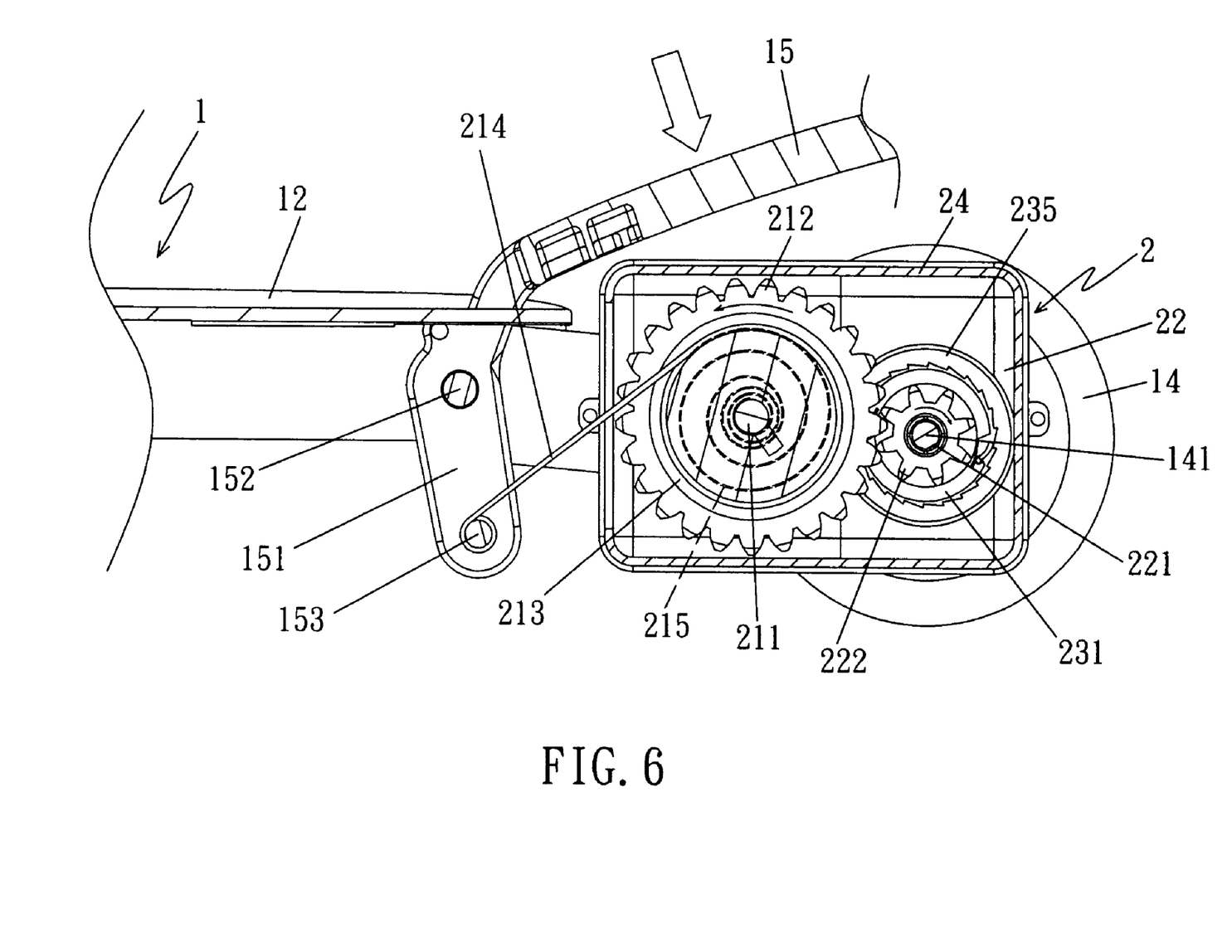
FIG. 6 is the operational schematic showing the treading down status of the treadle for the scooter of the present invention.
Figure 7:
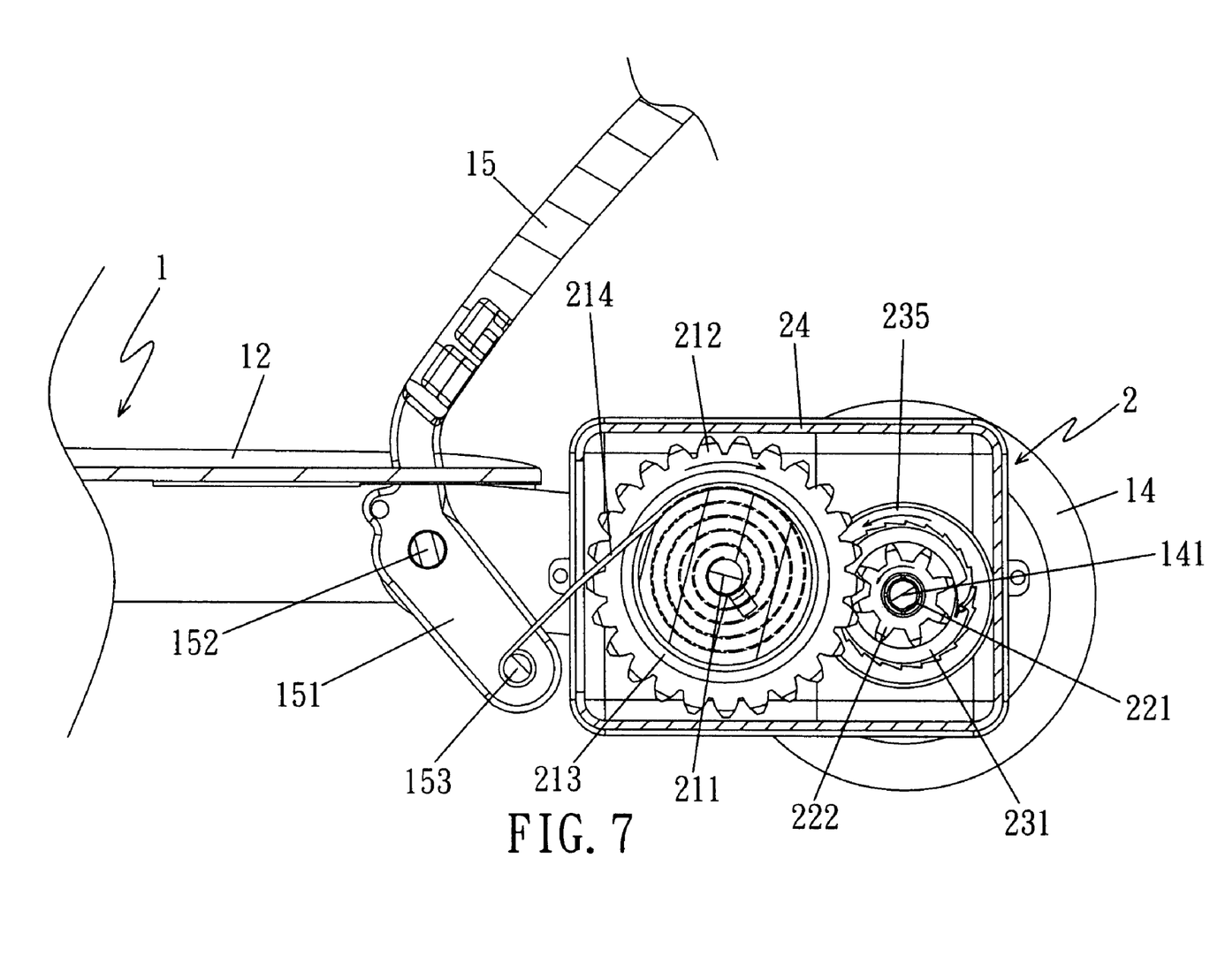
FIG. 7 is the operational schematic showing the releasing up status of the treadle for the scooter of the present invention.

Regarding the operation for the scooter of the present invention, please refer to FIGS. 6 and 7. The user, who stands on the scooter assembly 1, can drive the scooter forwards by only constantly treading downwardly and releasing upwardly the treadle 15 on the scooter assembly 1 alternately.

As shown in the FIG. 6, when the treadle 15 is treaded downwardly, the treadle 15 with jointing lever 151 is pivoted downwardly by using the shaft 152 as pivotal fulcrum to cause the linking rod 153 of the jointing lever 151 being pivoted forwardly so that the pulling wire 214 is tautly pulled by the linking rod 153 to activate reset device 21 of the driving mechanism 2 turn forwardly. Thereby, the spring coils 215 in the driving gear 212 of the reset device 21 will be tensely compressed, meanwhile the passively driven gear 222 of the transmission device 22 and the inner ring 231 of the irreversible transmission unit 23 are driven by the driving gear 212 to rotate simultaneously. However, the outer ring 235 is kept in "rest manner" because the arched catch 234 of the inner ring 231 can not catch the gear notches 236 of the outer ring 235. Thus, the rear wheel 14 is also kept in still sate due to no driving transmission.

As shown in the FIG. 7, when the treadle 15 is released upwardly, the spring coils 215 in the driving gear 212 of the reset device 21 will be relaxed in stretched manner to cause the driving gear 212 turn backwardly so that the pulling wire 214 is retracted and wound in the wire recess drum 213 as well as the treadle 15 with jointing lever 151 is pivoted upwardly, meanwhile the passively driven gear 222 of the transmission device 22 and the inner ring 231 of the irreversible transmission unit 23 are driven by the driving gear 212 to rotate simultaneously. Under this instance, the outer ring 235 is initiated into "active manner" because the arched catch 234 of the inner ring 231 is pushed against by the elastic reed 233 to catch the gear notches 236 of the outer ring 235. Thus, the scooter 1 is driven forwardly because the rear wheel 14 is activated by the outer ring 235 to rotate.

Basing on the disclosure heretofore, the scooter of the present invention is driven to run forwardly by constantly treading downwardly and releasing upwardly the treadle 15 alternately to relay the rotation via the driving gear 212, passively driven gear 222 and inner ring 231 of the driving mechanism 2 as well as the rear wheel 14. Thus, when the user stands on the tread deck 12, the usual kick action of single foot for the conventional scooter can be saved by means of the treading and releasing actions with the treadle 15 so that not only the risk of tumbling down accident can be avoided but also the effects in energy-saving and environmental protection can be achieved.

Moreover, based on one-to-one manner of the single treadle 15, single driving mechanism 2 and single rear wheel 14 for the exemplary embodiment disclosed heretofore, the scooter 1 of the present invention can be modified into manner of double treadles 15, double driving mechanisms 2 and double rear wheels 14 at will. Such kind of extensive design is feasible for the present invention.

Finally, though the driving mechanism 2 is contrived for the scooter of the present invention, but it is limited in the application for the present invention as a transportation vehicle. Actually, any instance or article involved the repeat rotation can fall into the application range of the driving mechanism 2. Moreover, the driving mechanism 2 can be served as an energy source to replace electric power such as electric treadmill, electric massage chair, electric massage mat, electric massage rod or electric razor and the like. Therefore, the driving mechanism 2 of the present invention has wide application in industrial usage.

In conclusion, the structural features disclosed in the present invention, which do achieve the expected objects and effects, and have practical value and property of advancement that means the present invention meets the basic patentability criterion of novelty, non-obviousness and practical industrial usage. Accordingly, we submit the patent application in accordance with the related patent laws for your perusal and examination with expectation and appeal for approving us a patent grant, which will be greatly appreciated by us. However, all the disclosure and illustrations heretofore are only the exemplary preferred embodiments, which are not intended for limiting the range of the embodiment for the present invention. Therefore, any equivalent alteration or modification, which does not depart from the claim range and specification essence of the present invention, should be reckoned as in the claim range of the present invention.

What is claimed is:

1. A scooter with driving mechanism comprises a scooter assembly with a tread deck, and at least a driving mechanism, wherein:

The tread deck has a treadle and at least a rear wheel;

The treadle includes a jointing lever extensively disposed at the front bottom side thereof such that the one end of the jointing lever is hingedly linked with the extension brackets by a shaft while the other end of the jointing lever is hingedly linked with the tread deck by a linking rod;

The rear wheel, which is disposed at the rear end of the extension brackets by a spindle;

The driving mechanism comprises a reset device, a transmission device, an irreversible transmission unit and a casing, wherein:

The reset device includes a stationary shaft, a hollow driving gear, a wire recess drum, a pulling wire and a spring coil, wherein the both ends of the stationary shaft are transversely extended and firmly fixed on the extension brackets to hold the reset device, the driving gear has at least a set of the spring coil disposed therein, the wire recess drum is disposed at the external side of the driving gear for being wound by the pulling wire, the other end of the pulling wire is connected to the linking rod of the jointing lever, the internal end of the spring coil is securely fixed on the stationary shaft while the external end of the spring coil is securely fixed in the inner wall of the driving gear;

The transmission device, which is disposed on the spindle of the rear wheel with a bearing set therebetween, has an irreversible transmission unit and a passively driven gear, wherein the passively driven gear is driven by the driving gear in meshed manner to drive the irreversible transmission unit in relay way, the irreversible transmission unit, which is connected to the rear wheel, is served to drive the rear wheel to rotate in single direction; and The casing is composed of two hollow half covers to contain the reset device and transmission device therein.

2. The scooter with driving mechanism is recited and claimed as in the claim 1, wherein a pair of extension brackets with the linking rod of the treadle is disposed near the breech end of the tread deck in symmetrical parallel juxtaposition outside of the driving mechanism and the rear wheel such that the driving mechanism and the rear wheel are securely disposed therebetween.

3. The scooter with driving mechanism is recited and claimed as in the claim 1, wherein the rear wheel has plural pegging holes created at the inner lateral side facing towards the irreversible transmission unit, while the irreversible transmission unit has plural pegs backwardly protruded at the outer side facing towards the rear wheel to correspond the pegging holes of the rear wheel so that the irreversible transmission unit can actively drive the rear wheel in coupling manner.

4. The scooter with driving mechanism is recited and claimed as in the claim 1, wherein the irreversible transmission unit is a ratchet to comprise an inner ring and an outer ring, wherein, the inner ring, which is coupled with the passively driven gear to rotate in synchronous manner, has plural dents created on the outer peripheral thereof such that each dent has a arched catch being pushed against by a elastic reed; and the outer ring, whose inner wall has plural gear notches for being caught by the arched catch of the inner ring to be driven by the inner ring in single direction of rotation transmission, has plural pegs backwardly protruded at the outer side facing towards the rear wheel to correspond the pegging holes of the rear wheel.

* * * * *